Figure 4:
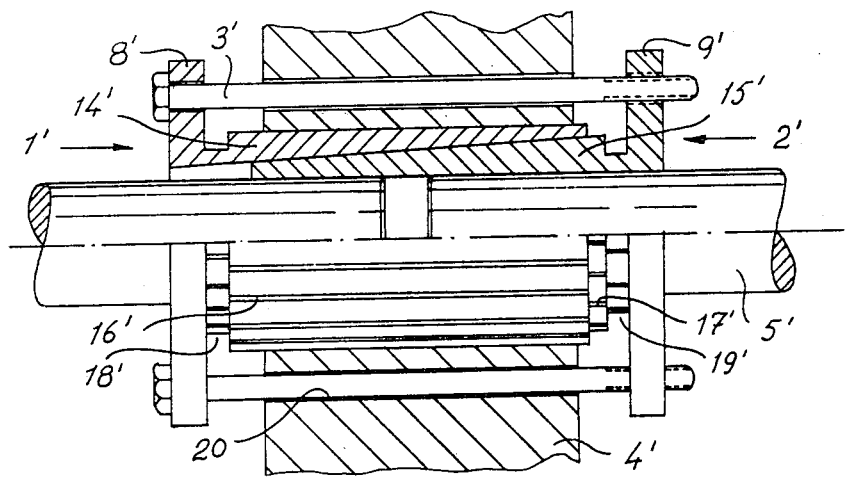

United States Patent [19]

Adell

[11] 4,364,687

[45] Dec. 21, 1982

[54] DOUBLE ACTING CONE COUPLING

[76] Inventor: Lars Adell, Fylkinggatan 45, S-595 00 Mjölby, Sweden

[21] Appl. No.: 200,496

[22] PCT Filed: Dec. 18, 1979

[86] PCT No.: PCT/SE79/00254

§ 371 Date: Jul. 10, 1980

§ 102(e) Date: Jul. 10, 1980

[87] PCT Pub. No.: WO80/01305

PCT Pub. Date: Jun. 26, 1980

[30] Foreign Application Priority Data

Dec. 18, 1978 [SE] Sweden .................... 7812978

[51] Int. Cl.³ .................................. F16D 1/06
[52] U.S. Cl. ................................ 403/370; 403/16
[58] Field of Search ............... 403/370, 371, 16

[56] References Cited

U.S. PATENT DOCUMENTS

| 2,262,112 | 11/1941 | Nash | 403/370 |
|---|---|---|---|
| 2,524,027 | 10/1950 | Blackmarr | 403/358 |
| 2,710,762 | 6/1955 | Whitaker | 403/16 |
| 2,816,452 | 12/1957 | McCloskey | 403/370 X |
| 2,849,886 | 9/1958 | McCloskey | 403/370 X |
| 3,257,070 | 6/1966 | Kuklinski | 403/370 X |
| 3,656,785 | 4/1972 | Lothar | 403/370 |
| 3,738,691 | 6/1973 | Firth | 403/371 X |

FOREIGN PATENT DOCUMENTS

| 133482 | 5/1976 | Denmark . |
| 86808 | 6/1956 | Norway . |
| 94242 | 7/1979 | Norway . |

*Primary Examiner*—Andrew V. Kundrat
*Attorney, Agent, or Firm*—Larson and Taylor

[57] ABSTRACT

Cone-coupling for interconnecting a hub (4) and a shaft (5) and comprising an outer cone sleeve (1) and an inner cone sleeve (2) designed for being clamped together by means of screws (3), whereby at least one of the cone sleeves is brought to move in the radial direction for interconnecting the hub (4) and the shaft (5). The radially moving cone sleeve or cone sleeves (1, 2) are formed with several axial slots (16, 17) extending through the material of the sleeves, and the said sleeve or sleeves (1, 2) are formed with a weakened deformation portion (18, 19) located axially outside the hub (4) to be connected to the shaft (5) and allowing a radial parallel displacement of the slotted sleeve portions (14, 15).

10 Claims, 6 Drawing Figures

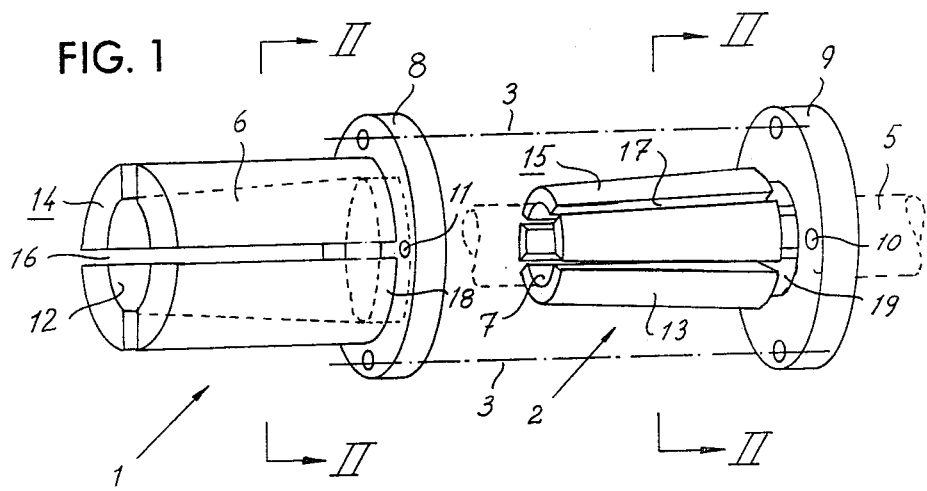
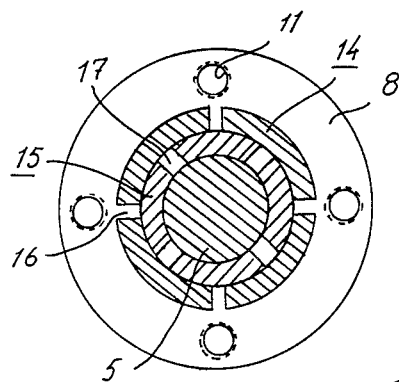
FIG. 1
FIG. 2
FIG. 3

DOUBLE ACTING CONE COUPLING

The present invention relates to a double acting cone coupling for interconnecting a shaft and a hub for locking of the two parts in connection to each other in the axial direction and/or against rotation in relation to each other.

Cone couplings for interconnecting a shaft and a hub are previously known which comprise a double-conical ring on one hand, which is slit up in the axial direction and which contacts the shaft or hub and two conical sleeves on the other hand each of which contacts a surface portion of the conical ring and which can be clamped towards each other by means of a screw connection while sliding along the cone surfaces of the conical ring. Such apparatus is shown in the British patent No. 1,390,431 or U.S. Pat. No. 3,430,613.

The said previously known devices are complicated to manufacture since they comprise at least three different parts which must be made matching each other, and the coupling must be manufactured with relatively narrow tolerances in order to make possible an interconnection of a shaft and a hub since the cone sleeves cannot to any substantial degree be expanded or contracted respectively in the radial direction. In many cases it is considered necessary to lock the cone sleeves in relation to one of the parts to be interconnected, for instance the hub and to lock the double conical ring in relation to the other part, for instance the shaft. For providing a clamping together of the two cone sleeves in order to get an acceptable interconnection of the shaft and hub, especially for transmitting torque from one part to the other there, is a need for strong axial forces in the said previously known couplings. Often the slit up conical ring can give different centering of the cone sleeves and thereby of the hub part in relation to the shaft part, whereby an imperfect rotation accuracy is obtained.

The object of the invention is to avoid the above mentioned disadvantages in the previously known couplings and to provide a cone coupling for interconnecting a shaft and a hub, which coupling is simple and can be manufactured at low cost, which gives a good centering, which comprises only few parts, which can move a substantial distance in the radial direction and therefore need not be manufactured with especially narrow tolerances and which has an inner closed flow of forces when used for interconnecting a shaft and a hub, so that the shaft or the hub need not be utilized for the interconnection of the said two parts, and which coupling has small outer dimensions, which can be manufactured in any desired actual lengths.

Figure 5:
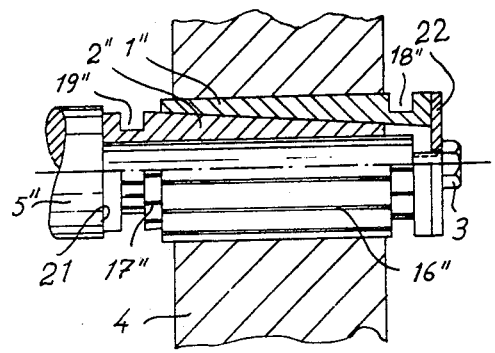
Figure 6:
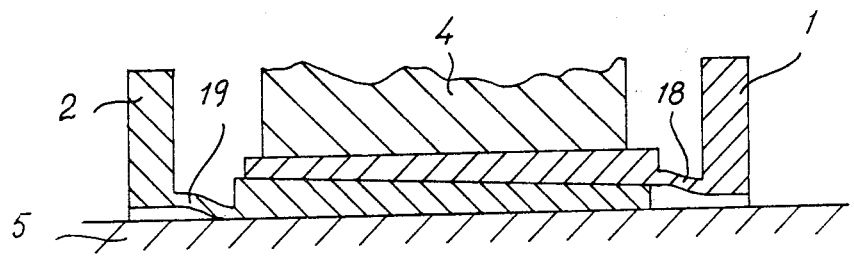

Further characteristics of the invention will be evident from the following detailed specification in which reference will be made to the accompanying drawings. In the drawings FIG. 1 diagrammatically shows a double-acting cone coupling according to the invention with the parts thereof separated. FIG. 2 is a cross section along line II—II of FIG. 1, and FIG. 3 shows a partial cross section through a shaft and a hub which are interconnected by means of the cone coupling according to FIGS. 1 and 2. FIG. 4 shows a modified embodiment of a coupling according to the invention adapted for connecting a hub to a two-part shaft. FIG. 5 shows a partial cross section through a modified coupling according to the invention. FIG. 6 diagrammatically and strongly exaggeratedly illustrates the function of the coupling.

The apparatus illustrated in FIGS. 1–3 generally comprises an outer cone sleeve 1 and an inner cone sleeve 2 which are designed for being combined and clamped to each other by means of screws 3. The outer cone sleeve 1 is intended to carry a hub 4 or a similar means and the inner cone sleeve 2 is adapted to enclose a shaft 5. For this purpose the outer surface 6 of the outer cone sleeve 1 is formed as a circular cylinder, and likewise the inner surface 7 or the inner cone sleeve 2 is formed as a circular cylinder. At one end each of the outer cone sleeve 1 and the inner cone sleeve 2 has a radially outwards projecting collar 8 and 9 respectively. The collar 9 has several axial through holes 10 and on corresponding places the collar 8 is formed with threaded holes 11 for the screws 3. The outer sleeve 1 has an inner surface 12 which converges in a direction away from collar 8 and the inner sleeve correspondingly has a converging outer surface 13. The outer surface 13 has a slightly larger dimension than the inner surface 12 so that the collars 8 and 9 are located somewhat spaced when the sleeves are brought together as shown in FIG. 3. The sleeve portions 14 and 15 projecting from the collars 8 and 9 respectively are formed with several axial through slots 16 and 17 respectively. In the illustrated case there are four slots which are provided diametrically opposed. According to need, the sleeves may be formed with a larger or a less number of slots. The two sets of slots 16 and 17 are displaced 45° in relation to each other, so that the slots 17 fall at an even part of the inner surface 12 when the coupling is mounted.

Each of the outer cone sleeve 1 and the inner cone sleeve 2 is formed with a deformation zone in order to make radial expansion and radial contraction possible when the sleeve portions 14 and 15 are clamped together thereby interconnecting the hub 4 and the shaft 5. The deformation zone is located just adjacent the collar 8 and 9 respectively. Depending on the cone formation the outer sleeve 1 has its thinnest portion 18 located adjacent the collar 8, and if the sleeve is formed with relatively thin walls, the said thin portion 18 provides the deformation zone of the outer cone sleeve. The inner cone sleeve 2 on the contrary has a thick portion located adjacent the collar 9 and in order to provide a deformation zone it is therefore formed with a radial groove 19 at or very close to the collar 9 thereby providing the intended deformation zone.

If the outer cone sleeve 1 is made of a thicker material it may be necessary or suitable to provide a radial groove adjacent the collar 8 in order to get a portion which is thin enough to allow the sleeve portion 14 to become expanded.

In FIG. 6 is a diagrammatically and strongly exaggerated illustration of how the sleeve portion 14 expands and the sleeve portion 15 contracts by being parallelly displaced when the sleeves are clamped together. The said parallel displacement is made possible by the action of the deformation zones 18 and 19 respectively.

The connection of the hub 4 on the shaft 5 is made in that the sleeve 2 is introduced in the sleeve 1 and the screws 3 are pulled slightly. The outer sleeve 1 is introduced in the center hole of the hub 4 and the shaft 5 is introduced in the center hole of the inner sleeve 2. When screws 3 are tightened, the sleeve portion 14 of the outer sleeve is pressed radially outwards and the sleeve portion 15 of the inner sleeve is pressed radially inwards so that the hub 14 and the shaft 5 provide a common unit.

In FIG. 4 is shown an alternative embodiment of the invention in which the sleeves 1' and 2' are provided on opposite sides of the hub 4 and in which the clamping together of the two sleeves is made by means of screws 3' extending through axial bores 20 in the hub 4. In this case both the outer cone sleeve 1 and the inner cone sleeve 2 are formed with radial weakening grooves 18' and 19' and the sleeves are formed with a large number of longitudinal slots 16', 17'. FIG. 4 also shows how two separate shafts 5' extending on opposite sides of the coupling can be connected to a common hub 4.

FIG. 5 shows an embodiment of the invention in which a hub 4 is connected to a shaft 5" at the outer end thereof and in which the shaft is formed with a reduced part providing a shoulder 21 which is contacted by the thick end of the inner cone sleeve 2". The outer cone sleeve 1" is pressed to the inner cone sleeve 2" by means of a screw 3 which is threaded into the end of the shaft and which actuates the end of the outer cone sleeve over a washer 22. In this case there is no need for radial collars on the cone sleeves. The annular grooves 18" and 19" may be used if needed for the connection of a puller to separate the cone sleeves in the event that the cone sleeves become wedged up into each other.

It is to be understood that the above specification and the embodiments of the invention illustrated in the drawings are only illuminating examples and that all kinds of different modifications may be presented within the scope of the appended claims.

I claim:

1. A cone coupling for interconnecting two elements, such as a shaft and a hub, which are rotatable relative to one another, comprising:

an elongate outer cone sleeve having an inner conically tapered surface, having a strengthened base portion adjacent an end thereof, and having a cylindrical sleeve portion having a plurality of elongate axial through slots, each axial through slot extending along the entire sleeve portion from one end thereof to a position adjacent said strengthened base portion;

An elongate inner cone sleeve having an outer conically tapered surface, having a strengthened base portion adjacent an end thereof and having a cylindrical sleeve portion having a plurality of elongate axial through slots, each axial through slot extending along the entire sleeve portion from one end thereof to a position adjacent said strengthened base portion;

said inner and outer cone sleeves being adapted to be pulled together for connection together with the inner surface of the outer cone sleeve pressed against the outer surface of the inner cone sleeve;

said inner and outer cone sleeves each comprising a deformation zone in said cylindrical sleeve portion at a location adjacent said strengthened base portion, each of said deformation zones being constructed and arranged to permit a parallel radial displacement of the slotted sleeve portions of said inner and outer cones relative to their respective strengthened base portions upon press pulling together of the inner and outer cone sleeves.

2. A cone coupling according to claim 1 wherein said deformation zone of said inner cone sleeve comprises a radial groove adjacent said strengthened base portion.

3. A cone coupling according to claim 2 wherein said inner cone sleeve groove is in the outer surface of said inner sleeve.

4. A cone coupling according to claim 1 wherein said outer cone sleeve comprises a substantially cylindrical outer surface, and wherein the conically tapered inner surface of said outer cone sleeve tapers inwardly in a direction away from said strengthened base portion whereby said deformation zone comprises the weakest portion of the outer cone sleeve.

5. A cone coupling according to claim 1 wherein each of said strengthened base portions comprise a flange, each of said flanges including apertures which, when in axial alignment, accomodate means for pulling together said cone sleeves.

6. A cone coupling according to claim 5 wherein, when said flange apertures are in axial alignment, the through slots in said inner and outer end sleeves are out of radial alignment.

7. A cone coupling according to claim 3 wherein said outer cone sleeve comprises a substantially cylindrical outer surface, wherein the conically tapered inner surface of said outer cone sleeve tapers outwardly in a direction away from said strengthened base portion, and wherein said deformation zone of said outer sleeve cone comprises a radial groove adjacent said strengthened base portion.

8. A cone coupling according to claim 1 wherein said deformation zone of said outer cone sleeve comprises a radial groove adjacent said strengthened base portion.

9. A cone coupling according to claim 8 wherein said outer cone sleeve groove is in the outer surface thereof.

10. A cone coupling according to claims 7, 8, or 9 wherein the strengthened base portion of said outer cone sleeve is provided with an axial aperture for receiving screw means for pulling said cone sleeves together.

* * * * *